Aug. 25, 1953   L. M. CLARK ET AL   2,649,973
DRAFT GEAR
Filed March 11, 1952   2 Sheets-Sheet 1
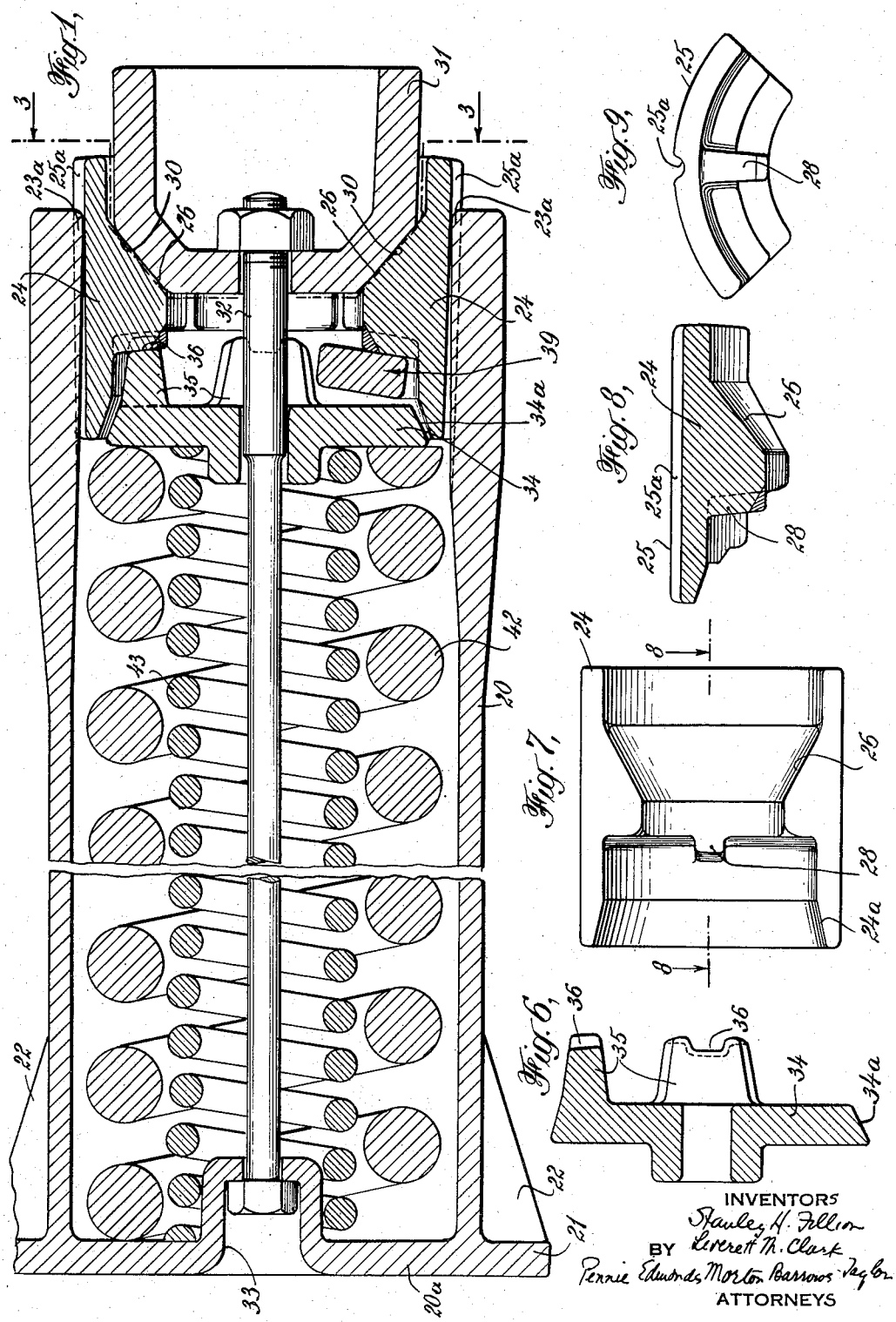
INVENTORS
Stanley H. Fellion
Leverett M. Clark
BY
Pennie Edmonds Morton Barrows & Taylor
ATTORNEYS

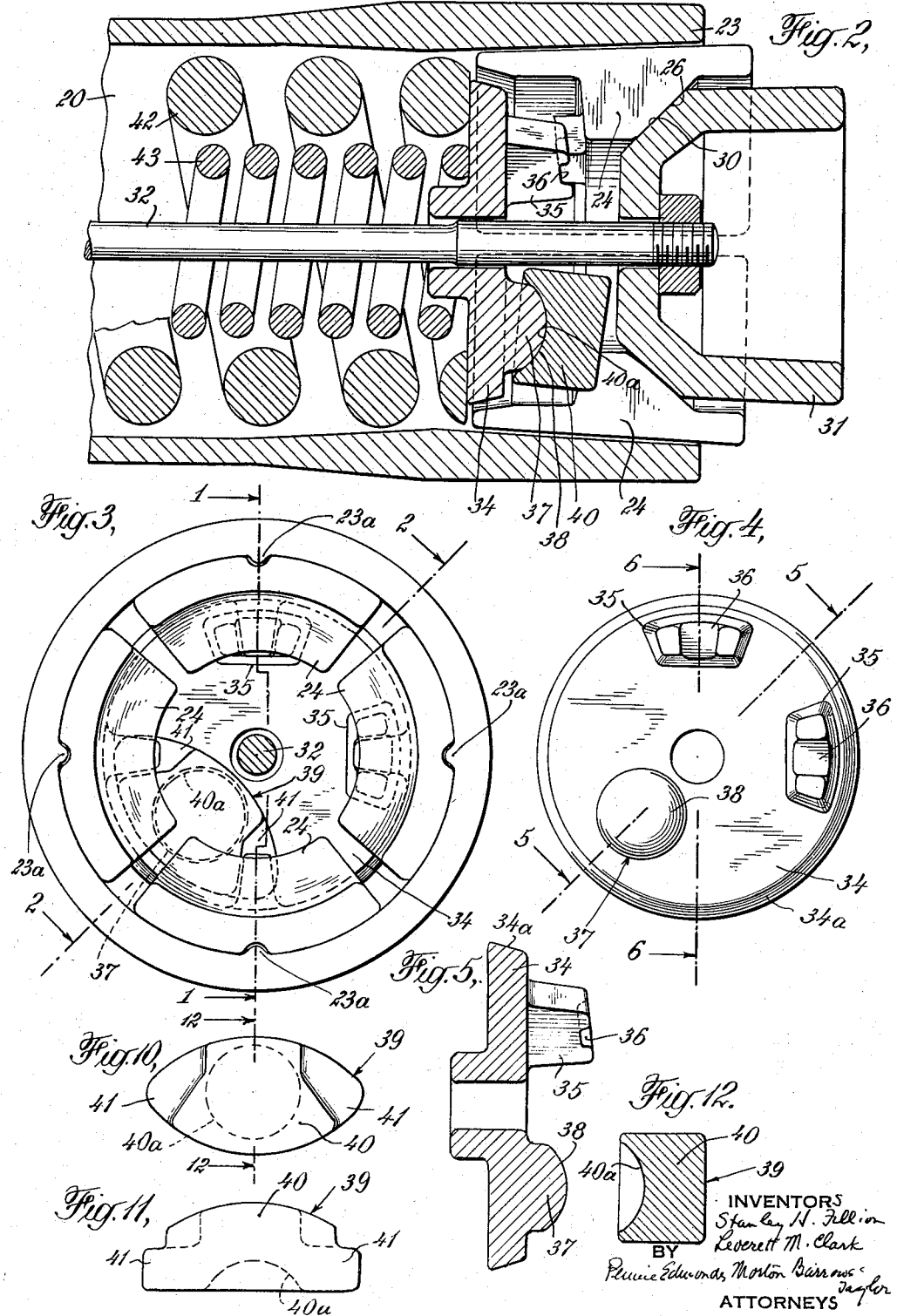

Patented Aug. 25, 1953

2,649,973

UNITED STATES PATENT OFFICE 2,649,973

DRAFT GEAR

Leverett M. Clark, Los Angeles, Calif., and Stanley H. Fillion, Scarsdale, N. Y., assignors to Waugh Equipment Company, New York, N. Y., a corporation of Maine Application March 11, 1952, Serial No. 275,998

10 Claims. (Cl. 213—34)

This invention relates to cushioning mechanisms of the energy-absorbing type and is concerned more particularly with a novel friction cushioning mechanism, which may be advantageously employed as a draft gear for railway equipment.

One type of friction draft gear now in common use includes a housing generally cylindrical in form and open at one end, the housing having an internal friction generating surface, usually of frusto-conical shape, within its open end. Three friction shoes lying side by side engage the friction surface and the shoes have internal wedging surfaces engaged by corresponding surfaces on an actuating plunger, which projects out of the housing beyond the outer ends of the shoes. Movement of the shoes into the housing is resisted by a spring acting on the inner ends of the shoes and seated on the end of the housing remote from the shoes.

In a draft gear of the type described, the three longitudinal sections of the housing defined internally by the areas of the friction surface lying between and not engaged by the shoes are subjected to stresses during the operation of the gear, which may result in splitting of the housing, and it is, therefore, desirable to employ more than three shoes in order that a better distribution of the stresses in the housing may be obtained. However, when more than three shoes are used, the spring is unlikely to act equally on all the shoes and insure that they will press with equal force against the friction surface and, thus, share equally in the operation of the gear.

The present invention is directed to the provision of a friction draft gear, in which more than three shoes are employed and in which means are provided for applying the force of the spring to the shoes in such manner that the shoes take part equally in generating friction. In the new gear, the spring means act on the shoes through follower means, which include a follower in direct contact with the spring means. The follower directly engages certain of the shoes, and it transmits the force of the spring means to the other shoes through one or more rockers, each having a restricted contact with the follower. The number of rockers employed depends upon the number of shoes used and, in a gear containing four shoes, for example, the follower may act directly on two adjacent shoes and the other two shoes are engaged by the rocker. Since the rocker has a restricted contact with the follower, it can adjust itself, so that the shoes engaged thereby press with equal force against the friction surface.

For a better understanding of the invention, reference may be had to the accompanying drawings, in which:

Fig. 1 is a view of one form of the new gear in longitudinal section on the line 1—1 of Fig. 3;

Fig. 2 is a sectional view on the line 2—2 of Fig. 3;

Fig. 3 is a transverse sectional view on the line 3—3 of Fig. 1;

Fig. 4 is an outer end view of the follower;

Figs. 5 and 6 are sectional views on the lines 5—5 and 6—6 of Fig. 4;

Fig. 7 is a view in side elevation showing the inner face of one of the shoes;

Fig. 8 is a sectional view on the line 8—8 of Fig. 7;

Fig. 9 is an inner end view of the shoe;

Figs. 10 and 11 are front elevational and side views, respectively, of a rocker; and Fig. 12 is a sectional view on the line 12—12 of Fig. 10.

The gear shown in Fig. 1 comprises a housing 20 open at one end and closed at the other by an end wall 20a. At its closed end, the housing is provided with flanges 21 strengthened by ribs 22. Within its open end, the housing is formed with a frusto-conical friction surface 23 tapering in diameter inwardly and formed with a plurality of longitudinal ribs 23a equi-angularly spaced. In the construction shown, the gear has four shoes, and there are four ribs 23a, which serve as guiding means for the shoes.

Each of the shoes 24 has an arcuate outer surface 25 formed with the lengthwise central depression 25a for receiving a rib 23a on the friction surface. On its inner face, each shoe is formed with an internal wedging surface 26 lying between the ends of the shoe and a short longitudinal rib 28 projecting inwardly from the inner end of the wedging surface. The shoes are curved in section, as shown in Fig. 9, so that their curved outer surfaces 25 can make good contact with the friction surface 23 of the housing.

The wedging surfaces 26 on the shoes are engaged by corresponding surfaces 30 on an actuating plunger 31, which projects outwardly beyond the outer ends of the shoes. The plunger has a central opening, through which extends a tie-bolt 32, the bolt extending through the housing and having a head, which lies within a socket 33 defined by an integral part of the end wall 20a of the housing.

A follower 34 lies within the housing at the inner ends of the shoes and has a central opening, through which the bolt extends. The follower is provided with a pair of pads 35 projecting outwardly from its outer face near its periphery and displaced angularly through 90°. Each pad is provided at its outer end with a recessed seat 36 for receiving the end of the rib 28 on a shoe. The follower is also provided, on its outer face, with a projection 37 having a spherical end surface, the axis of the projection being displaced 135° from the median radial planes through the pads 35.

A rocker 39 engages projection 38 and has a body 40 formed with a spherical recess 40a in its inner surface for receiving the spherical end surface of the projection. The rocker has lateral extensions 41 engaging the inner ends of the wedging surfaces on a pair of adjacent shoes at one side of the ribs 28 thereon. By reason of the rocker and projection having spherical contacting surfaces, these parts have, in effect, a restricted contact, so that the rocker may rock in all directions on the end of the projection.

The housing contains spring means illustrated as made up of a heavy outer coil spring 42 and an inner lighter coil spring 43. The springs are seated at one end against the inner surface of the end wall 20a of the housing and, at the other, against the inner face of the follower. The peripheral surface of the follower is beveled, as indicated at 34a, and the inner ends of the shoes are similarly beveled, as indicated at 24a. This permits the follower to be almost completely telescoped within the inner ends of the group of shoes, so that the springs may be of greater length than would be possible if the follower lay entirely beyond the inner ends of the shoes.

When the gear is installed in the draft pocket between the longitudinal sills of a railway car, the rear end wall 20a engages the stops on the sills at one end of the pocket and the outer end of plunger 31 engages a follower in contact with another pair of stops on the sills. The gear is encircled by a yoke connected to the coupler and having end members contacting with the outer surfaces of the end wall 20a of the housing and the follower. When the coupler is subjected to a force, for example, in buff, the inward movement of the coupler and yoke cause a reduction in the over-all length of the gear. In this operation, the plunger moves into the housing, forcing the shoes with it, and the shoes force the follower and rocker inwardly against the resistance of the springs. As the shoes move inwardly, the two shoes engaged by the rocker may adjust themselves by rocking of the rocker, so that they make good contact at all times with the friction surface. The force of the springs is thus in effect transmitted to the shoes through three points, namely, the ribs 28 on two shoes and the projection 37, which engages the rocker in contact with the other two shoes. The action of the four shoes against the friction surface is thus uniform and, in this respect, the gear operates as satisfactorily as one containing three shoes only. At the same time, since there are four longitudinal sections of the housing defined by spaces between adjacent shoes rather than three, as in a three-shoe gear, there is a better distribution of the stresses on the housing and less likelihood that the housing will split because of concentration of stresses.

In the construction shown, the gear includes four shoes and one rocker but the principles involved may be applied to gears having more than four shoes, as follows. If the gear has five shoes, the follower acts directly on one shoe and, through a pair of rockers, on the remaining shoes, each rocker having a restricted contact with the follower and acting on a pair of adjacent shoes. If six shoes are to be used, three rockers are employed, with each rocker engaging a projection on the follower and acting on a pair of adjacent shoes.

In the appended claims, the term "restricted contact" is intended to mean a contact of such area that the rocker may be moved freely in all directions about the contact as a fulcrum.

We claim:

1. A draft gear, which comprises a housing having an open end and an internal friction surface adjacent said end, at least four friction shoes arranged in a circular series in the housing and engaging the friction surface, an actuating plunger extending within the series of shoes, the plunger and shoes having co-operating wedging surfaces, spring means within the housing for resisting the inward movement of the shoes, and internal follower means interposed between and engaging the spring means and the shoes, the internal follower means including a follower in direct contact with the spring means and at least one rocker directly engaging a pair of adjacent shoes only, the follower and rocker having spherical engaging surfaces.

2. A draft gear, which comprises a housing having an open end and an internal friction surface adjacent said end, four friction shoes arranged in a circular series in the housing and engaging the friction surface, an actuating plunger extending within the series of shoes, the plunger and shoes having co-operating wedging surfaces, spring means within the housing for resisting the inward movement of the shoes, and internal follower means interposed between and engaging the spring means and the shoes, the internal follower means including a follower in direct contact with the spring means and engaging a pair of adjacent shoes only, and a rocker directly engaging the other two shoes only, the follower and rocker having spherical engaging surfaces.

3. A draft gear, which comprises a housing having an open end and an internal friction surface adjacent said end, four friction shoes arranged in a circular series in the housing and engaging the friction surface, each shoe having an internal wedging surface lying between the ends of the shoe, an actuating plunger extending within the series of shoes and having a wedging surface engaging the wedging surface on each of the shoes, spring means within the housing for resisting the inward movement of the shoes, and internal follower means interposed between and engaging the spring means and the shoes, the internal follower means including a follower in direct contact with the spring means and engaging a pair of adjacent shoes only inwardly from their wedging surfaces, and a rocker in direct restricted contact with the follower and engaging the other two shoes only inwardly from their wedging surfaces.

4. A draft gear, which comprises a housing having an open end and an internal friction surface adjacent said end, four friction shoes arranged in a circular series in the housing and engaging the friction surface, each shoe having an internal wedging surface lying between the ends of the shoe and a central longitudinal rib inwardly from the wedging surface, an actuating plunger extending within the series of shoes and having a wedging surface engaging the wedging surfaces on the shoes, spring means within the housing for resisting inward movement of the shoes, and internal follower means interposed between and engaging the spring means and the shoes, the internal follower means including a follower in direct contact with the spring means and engaging the inner ends of the ribs on a pair of adjacent shoes only, and a rocker in restricted contact with the follower and engaging the inner ends of the ribs on the other two shoes only.

5. A draft gear, which comprises a housing having an open end and an internal friction surface adjacent said end, four friction shoes arranged in a circular series in the housing and engaging the friction surface, each shoe having an internal wedging surface and a central longitudinal rib inwardly from said surface, an actuating plunger extending within the series of shoes and having a wedging surface engaging the wedging surfaces on the shoes, spring means within the housing for resisting inward movement of the shoes, and internal follower means interposed between and engaging the spring means and the shoes, the internal follower means including a follower in direct contact with the spring means and having recessed pads engaging the inner ends of the ribs on a pair of adjacent shoes only and a rocker in restricted contact with the follower and engaging the inner ends of the ribs on the other two shoes only.

6. A draft gear, which comprises a housing having an open end and an internal friction surface adjacent said end, four friction shoes arranged in a circular series in the housing and engaging the friction surface, each shoe having an internal wedging surface and a central longitudinal rib lying inwardly from said surface, an actuating plunger extending within the series of shoes and having a wedging surface engaging the wedging surfaces on the shoes, spring means within the housing for resisting inward movement of the shoes, and internal follower means interposed between and engaging the spring means and the shoes, the internal follower means including a follower in direct contact with the spring means and engaging the inner ends of the ribs on a pair of adjacent shoes only, and a rocker in restricted contact with the follower and having surfaces engaging the inner ends of the ribs on the other two shoes only and a projection lying between and serving to space the ribs on said other two shoes.

7. A draft gear, which comprises a housing having an open end and an internal friction surface adjacent said end, at least four friction shoes arranged in a circular series in the housing and engaging the friction surface, each shoe having an internal wedge surface and a central longitudinal rib extending inward from the inner end of said surface, an actuating plunger extending within the series of shoes and having a wedging surface engaging the wedging surfaces on the shoes, spring means within the housing for resisting inward movement of the shoes, and internal follower means interposed between and engaging the spring means and the shoes, the internal follower means including a follower in direct contact with the spring means and at least one rocker having a restricted contact with the follower and engaging the inner ends of the ribs on a pair of adjacent shoes only.

8. A draft gear, which comprises a housing having an open end and an internal friction surface adjacent said end, at least four friction shoes arranged in a circular series in the housing and engaging the friction surface, an actuating plunger extending within the series of shoes, the plunger and shoes having co-operating wedging surfaces, spring means within the housing for resisting the inward movement of the shoes, and internal follower means interposed between and engaging the spring means and the shoes, the internal follower means including a follower in direct contact with the spring means and lying in telescoped relation to the inner ends of the shoes and at least one rocker having a restricted contact with the follower and directly engaging a pair of adjacent shoes only.

9. A draft gear, which comprises a housing having an open end and an internal friction surface adjacent said end, four friction shoes arranged in a circular series in the housing and engaging the friction surface, an actuating plunger extending within the series of shoes, the plunger and shoes having co-operating wedging surfaces, spring means within the housing for resisting the inward movement of the shoes, and internal follower means interposed between and engaging the spring means and the shoes, the internal follower means including a follower in direct contact with the spring means and with a pair of adjacent shoes only and lying in telescoped relation to the inner ends of the shoes, and a rocker engaging the other two shoes only and having a restricted contact with the follower.

10. A draft gear, which comprises a housing having an open end and an internal friction surface adjacent said end, four friction shoes arranged in a circular series in the housing and engaging the friction surface, an actuating plunger extending within the series of shoes, the plunger and shoes having co-operating wedging surfaces, spring means within the housing for resisting the inward movement of the shoes, and internal follower means interposed between and engaging the spring means and the shoes, the internal follower means including a follower engaging the spring means and a pair of adjacent shoes only between their ends, the follower lying in telescoped relation to the inner ends of the shoes, and a rocker engaging the other two shoes only and having a restricted contact with the follower.

LEVERETT M. CLARK.
STANLEY H. FILLION.

No references cited.